Figure 1:
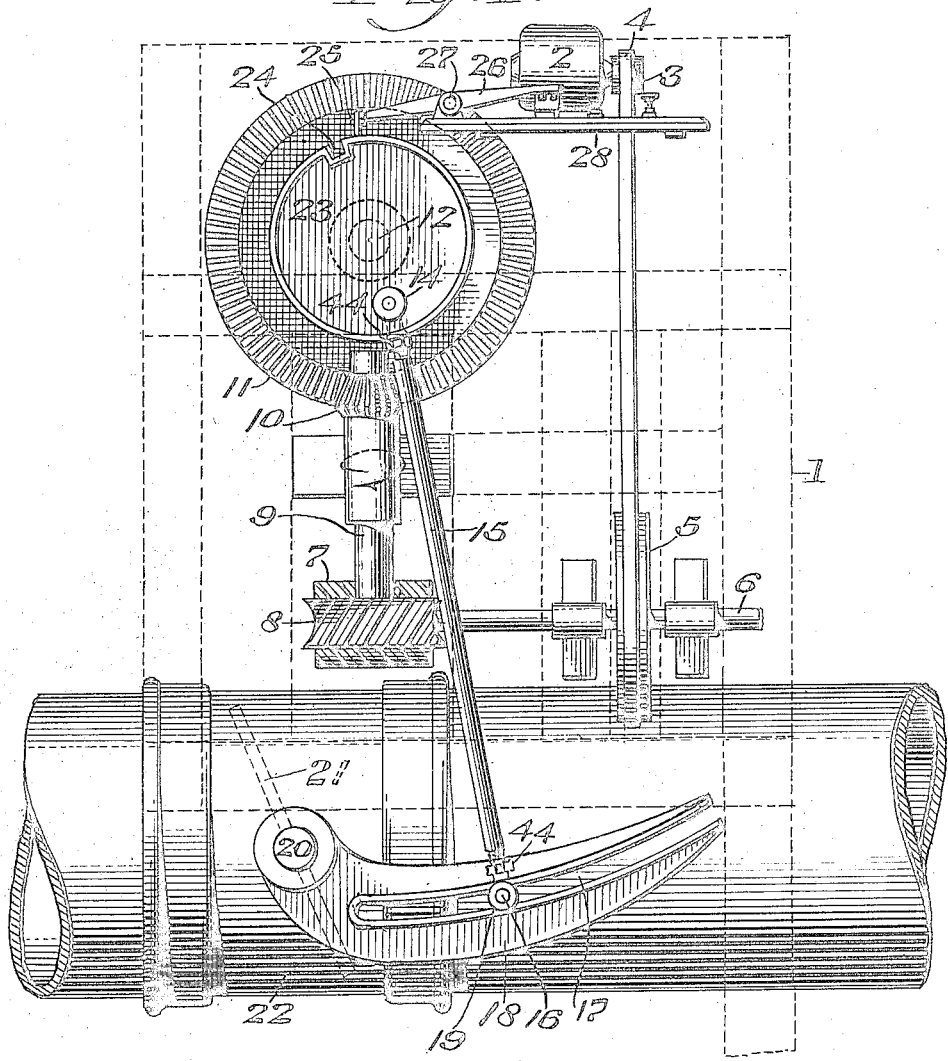

C. B. BUERGER.
DOSING DEVICE FOR CONTROLLING THE FLOW OF SEWAGE TO SPRINKLING FILTERS.
APPLICATION FILED JULY 29, 1913.

1,104,474.

Patented July 21, 1914.

2 SHEETS—SHEET 1.

WITNESSES

INVENTOR
Charles B. Buerger
BY
ATTORNEYS

C. B. BUERGER.
DOSING DEVICE FOR CONTROLLING THE FLOW OF SEWAGE TO SPRINKLING FILTERS.
APPLICATION FILED JULY 29, 1913.
1,104,474.
Patented July 21, 1914.
2 SHEETS—SHEET 2.
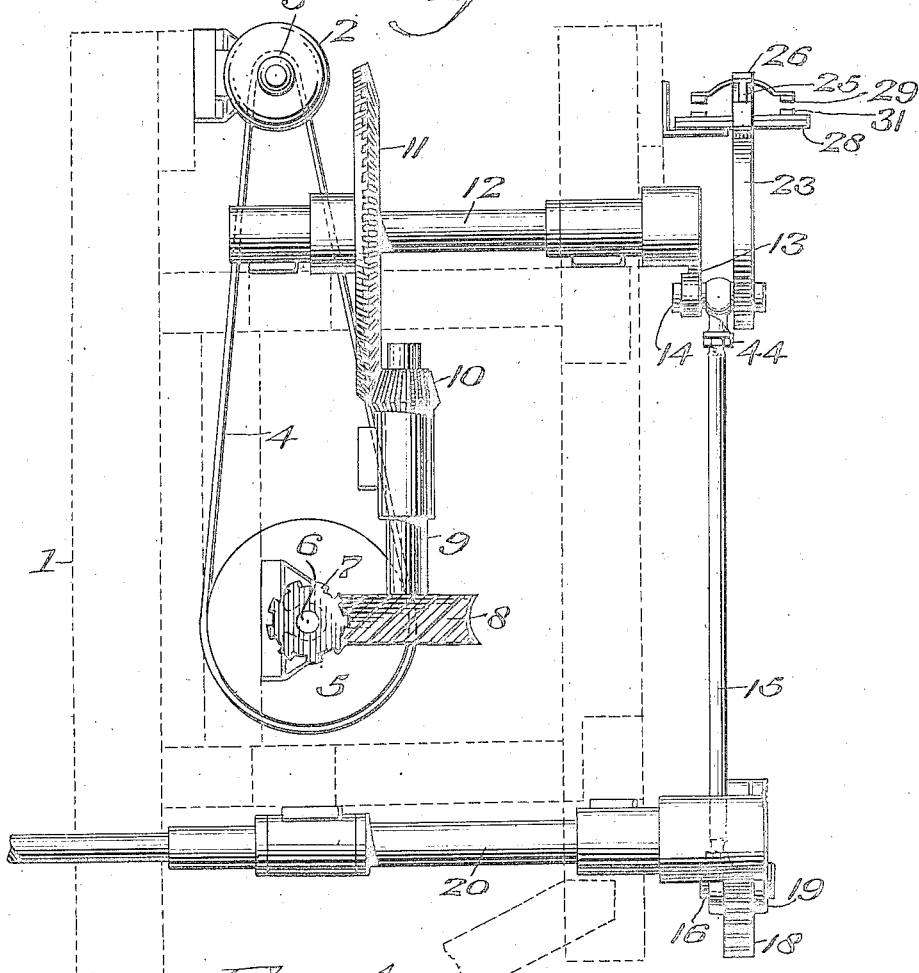
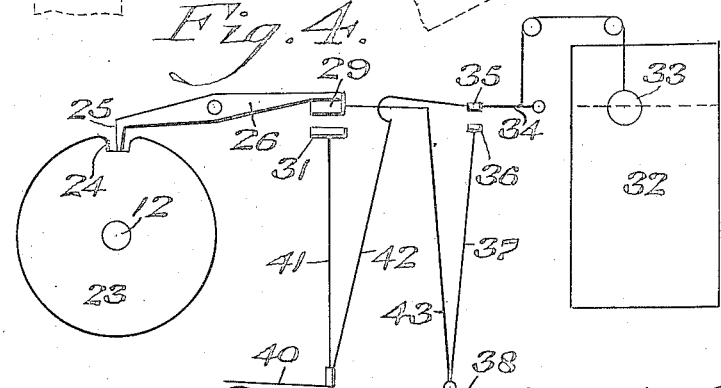
WITNESSES
O. F. Nagle
H. G. Dieterich
INVENTOR
Charles B. Buerger
BY Hiedersheim Fairbanks
ATTORNEYS

UNITED STATES PATENT OFFICE.

CHARLES B. BUERGER, OF NEW YORK, N. Y., ASSIGNOR OF ONE-HALF TO MORRIS L. BAYARD, OF WOODBINE, NEW JERSEY.

DOSING DEVICE FOR CONTROLLING THE FLOW OF SEWAGE TO SPRINKLING-FILTERS.

1,104,474.

Specification of Letters Patent. Patented July 21, 1914.

Application filed July 29, 1913. Serial No. 781,717.

*To all whom it may concern:*

Be it known that I, CHARLES B. BUERGER, a citizen of the United States, residing at New York city, county of New York, State of New York, have invented a new and useful Dosing Device for Controlling the Flow of Sewage to Sprinkling-Filters, of which the following is a specification.

Sprinkling filters as ordinarily constructed consist of beds of broken stone or other suitable material about six feet thick and usually covering a considerable area and over this area at uniform distances apart, usually between ten and fifteen feet, a series of nozzles are arranged through which the sewage is forced under a desired pressure in a spray form by causing the sewage to strike a splash or diverting plate after leaving the nozzle. The resultant cone or film of sewage distributes itself in approximately a ring form on the filter bed at a distance depending on the head or pressure on the nozzle, the diameter of the spray circle increasing with such pressure. In order to obtain an efficient distribution of the material it is essential to vary the head on the nozzle so that the diameter of the spray will vary from nothing to approximately the distance between the centers of the nozzles.

With the above in view my present invention consists of a novel dosing device for controlling the flow of sewage to sprinkling filters and wherein novel means are provided for automatically controlling the valve mechanism.

It further consists of a novel construction of valve mechanism and novel means whereby the stroke of the valve may be varied as desired.

It further consists of novel means controlled by the level of the material in the dosing tank for automatically controlling the discharge of material from said dosing tank.

It further consists of a novel construction and arrangement of a float switch, contact switch, and mechanism operated thereby.

It further consists of novel means for permitting the operation of the motor during a predetermined interval after the opening of the float switch.

It further consists of other novel features of construction, all as will be hereinafter fully set forth.

For the purpose of illustrating my invention, I have shown in the accompanying drawing a preferred form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 2:
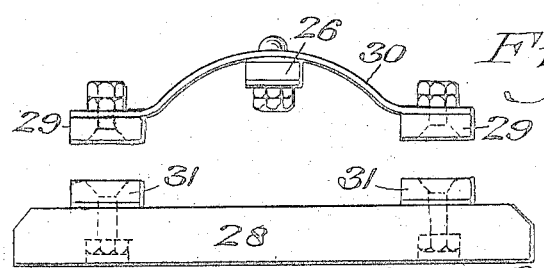

Figure 1 represents a plan view of a dosing device for controlling the flow of sewage to sprinkling filters embodying my invention, certain parts being removed for clearness of illustration. Fig. 2 represents an end view of a portion of Fig. 1. Fig. 3 represents a side elevation of Fig. 1. Fig. 4 represents a wiring diagram of the electrical circuits.

Similar numerals of reference indicate corresponding parts in the figures.

Referring to the drawings, 1 designates a frame which is secured in position in any desired manner, said frame having mounted thereon a motor 2, the shaft of which is provided with a pulley 3 around which latter passes a belt 4 said belt also passing around a pulley 5 mounted on a shaft 6 journaled in the frame 1. The shaft 6 is provided with a worm 7 which meshes with the worm wheel 8 on shaft 9, causing the same to rotate in the direction of the arrow seen in Fig. 1. The shaft 9 is provided with a pinion 10 which meshes with a gear 11 mounted on a shaft 12 journaled in the frame 1 in any desired manner.

The mechanism just described may vary widely in practice, the construction shown being simply to illustrate one manner of obtaining a speed reducing mechanism, whereby the shaft 12 will travel at a slow speed relatively to the high speed of the motor 2. The shaft 12 has mounted thereon a crank arm 13 provided with a pin 14 on which latter is mounted a link 15 which latter is connected with the pin 16, whereby a reciprocating movement is imparted to said pin. The pin 16 passes through a curved slot 17 of an arm 18 and is secured within said slot by means of a nut 19. The slot 17 is shaped in the form of an arc of a circle, the center of which is the center of the shaft 12.

20 designates a shaft mounted in the frame of the machine and connected with the arm 18 and also with a valve disk 21. The parts are so arranged that at the extreme end of the pushing motion of the link 15 and before starting a pulling motion of said link the valve disk 21 is in closed position. The valve disk 21 is mounted in a pipe line 22 which conveys the sewage to the sprinkling filter, the construction and operation of which latter will be understood by those skilled in this art and since the same forms no part *per se* of my present invention and is well known in the art, I have deemed it unnecessary to illustrate and describe the same. It will be seen that owing to the shape of the curved slot 17 the pin 16 may be moved to any desired position in said slot, and the extreme position of the arm 18 and valve disk 21 will still correspond with the closed position of said valve disk.

The crank pin 14 carries a disk or wheel 23 having a notch or recess 24 in the periphery thereof adapted to coöperate with a pin 25 of a switch 26, which is fulcrumed at 27 to a switch board 28, so as to open or close the circuit through the contacts 29 carried by a spring member 30 and the binding posts 31. The arm 26 is normally in such a position that it closes the switch but when the notch 24 comes opposite the pin 25, said pin 25 will drop into said notch 24 and the switch will be opened. The notch 24 is so placed that the switch is open when the valve disk 21 is about in its closed position, as seen in Fig. 1.

32 designates the supply or dosing tank in which is located a float 33 operatively connected with a float switch 34, the contact 35 of which coöperates with a contact 36 of line 37 leading from line 38, which latter leads from the motor 39.

40 designates the other line from the motor which is connected by line 41 with the contacts 31.

42 designates a line leading from line 40 to the contact 35 of the float switch 34.

43 designates a line leading from line 38 to the contacts 29.

The operation will now be readily understood and is as follows:—When the sewage in the dosing tank reaches a predetermined level, the float switch 34 closes. The electric circuit is made in whatever position the contact lever 26 may be and the motor is set in motion thereby, owing to the connecting mechanism, opening and closing the valve. The contact lever 26 forming a part of the switch is closed at all points except when the valve 21 is closed at which time such switch is open. As the level in the dosing tank drops, the float switch 34 opens and if the valve 21 is in open position at this time, the switch lever 26 will be closed and the motor 2 will continue in operation until the valve 21 reaches a closed position when the switch lever 26 will open and the machine will stop. The machine will remain stopped until the rise of sewage in the dosing tank will again cause the float switch to close the circuit. The slot 17 in the arm 18 is used so that the throw of the arm 18 relative to the constant throw of the crank 13 can be adjusted so that the flow from the valve 21 approximates the flow to the dosing tank 32 from the source of supply and in such case the machine can work fairly steadily with few stops and starts. It is desirable to adjust the arm 18 so that the flow through the valve will be somewhat greater than the supply to the dosing tank and the excess overflow will be compensated for by the periodic stops of the machine. This will also permit a change in the rate of supply without giving the machine any attention. The periodic stopping of the machine does not injure the efficiency of the operation, since the sprinkling filter works with the same efficiency when intermittently fed at a higher rate than the average. It will now be apparent that the throw of the valve may be regulated as desired and that the operation stops only when the valve in the discharge line is in a closed position.

It will now be apparent that I have devised a novel and useful construction of a dosing device for controlling the flow of sewage to sprinkling filters which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a supply tank, a conduit, a valve therefor, a motor operatively connected with said valve to open and close the same, and an electric circuit including a float switch controlled by the liquid in said supply tank, an automatically controlled contact switch, and means connected to said valve and contact switch and constructed to open the circuit only when said valve is in closed position.

2. In a device of the character stated, a valve, a rock arm connected therewith, a motor, speed changing mechanism connecting said rock arm and motor, an electric circuit including an automatic switch controlling said motor and a contact switch, and means driven by said speed changing mechanism to control said contact switch.

3. In a device of the character stated, a supply tank, a valve, a rock arm therefor, a longitudinally adjustable connection in sliding engagement with said rock arm, a crank connected with said connection, devices to rotate said crank, an electric circuit for said devices and including means to close the circuit when a predetermined level is reached in the supply tank, and means controlled by the crank during its rotation to open said circuit.

4. In a device of the character stated, a supply tank, a valve, an arm connected therewith, a connection from said arm, a crank secured to said connection, devices to rotate said crank, an electric circuit controlling said devices and including a float switch governed by the fluid level in the supply tank, and a contact switch, and a device actuated by said crank and controlling said contact switch.

5. In a device of the character stated, a a supply tank, a valve, an arm connected therewith, a connection from said arm, a crank secured to said connection, devices to rotate said crank, an electric circuit controlling said devices and including a float switch governed by the fluid level in the supply tank, and a member rotated by said crank and having a recess coöperating with said contact switch to open the circuit.

6. In a device of the character stated, a supply tank, a conduit from said tank, a valve in said conduit, an electric circuit, a motor in said circuit, means connecting said valve and motor to open and close the former, a switch in said circuit, means for closing and opening said switch by the rise and fall of liquid level in said supply-tank, a contact switch in the circuit and controlling said motor, and means for actuating said switch and connected to the valve-actuating means to open the switch when the valve is in closed position.

CHARLES B. BUERGER.

Witnesses:
SIGMUND LIPPSTADT,
GEO. H. BELL.